(12) United States Patent
Shahin

(10) Patent No.: US 12,687,207 B2
(45) Date of Patent: Jul. 21, 2026

(54) PAD SPRING

(71) Applicant: HL MANDO CORPORATION,
Pyeongtaek (KR)

(72) Inventor: Hatem Shahin, Pfaffenhofen (DE)

(73) Assignee: HL MANDO CORPORATION,
Pyeongtaek (KR)

( * ) Notice: Subject to any disclaimer, the term of this
patent is extended or adjusted under 35
U.S.C. 154(b) by 487 days.

(21) Appl. No.: 18/185,498

(22) Filed: Mar. 17, 2023

(65) Prior Publication Data

US 2024/0026942 A1     Jan. 25, 2024

(30) Foreign Application Priority Data

Jul. 21, 2022     (KR) ........................ 10-2022-0090276

(51) Int. Cl.
F16D 65/097          (2006.01)
(52) U.S. Cl.
CPC ................................ F16D 65/0972 (2013.01)
(58) Field of Classification Search
CPC ............. F16D 65/0977; F16D 65/0979; F16D
65/0972
See application file for complete search history.

(56) References Cited

U.S. PATENT DOCUMENTS

2004/0222053 A1* 11/2004 Wemple .............. F16D 65/0977
188/73.38
2013/0025981 A1* 1/2013 Maehara ............. F16D 65/0978
188/73.31

(Continued)

FOREIGN PATENT DOCUMENTS

DE      20 2015 104 454 U1    11/2015
DE      20 2017 100 837 U1     4/2017
(Continued)

OTHER PUBLICATIONS

DE OA dated Dec. 21, 2024.
KR OA dated Sep. 30, 2025.

*Primary Examiner* — Bradley T King
(74) *Attorney, Agent, or Firm* — Harvest IP Law, LLP

(57)          ABSTRACT

A pad spring of a caliper brake according to the present
embodiment is provided as a pair of pad springs for elasti-
cally supporting a pair of pad plates on a carrier, and the pad
springs includes a pair of clip bases in contact with protrud-
ing surfaces of protrusions formed on two sides of the pad
plates, a pair of first anchors connected to lower ends of the
clip bases and formed to be curved in contact with lower
surfaces of the protrusions, a pair of second anchors con-
nected to upper ends of the clip bases and formed to be
curved in contact with upper surfaces of the protrusions, a
connector configured to connect the pair of second anchors,
and a pair of retainers having one ends bonded to the clip
bases and formed to extend inward and the other ends curved
outward to be in contact with and support the pad plates and
formed to extend, wherein the pair of retainers include an
inner retainer in contact with and supporting an inner pad of
the pair of pad plates and an outer retainer in contact with
and supporting an outer pad of the pair of pad plates, and the
inner retainer is formed of a material having a higher rigidity
than the outer retainer.

8 Claims, 8 Drawing Sheets

(56)          References Cited

U.S. PATENT DOCUMENTS

| | | | | |
|---|---|---|---|---|
| 2016/0053837 A1* | 2/2016 | Lou | F16D 55/225 | |
| | | | 188/73.38 | |
| 2016/0076611 A1* | 3/2016 | Boyle | F16D 65/0972 | |
| | | | 188/72.3 | |
| 2017/0248182 A1* | 8/2017 | Kim | F16D 65/0972 | |
| 2019/0203788 A1* | 7/2019 | Sekiguchi | F16D 55/226 | |
| 2021/0010554 A1* | 1/2021 | Wecker | F16D 65/0972 | |
| 2021/0239169 A1* | 8/2021 | Baek | F16D 65/0972 | |
| 2024/0263679 A1* | 8/2024 | Nakanome | F16D 65/097 | |
| 2024/0425019 A1* | 12/2024 | Ahn | F16D 65/0972 | |

FOREIGN PATENT DOCUMENTS

| | | |
|---|---|---|
| DE | 10 2021 208 405 A1 | 2/2023 |
| JP | 6873042 B2 | 5/2021 |
| KR | 10-1040937 B1 | 6/2011 |
| KR | 10-1622789 B1 | 5/2016 |
| KR | 10-2021-0098641 A | 8/2021 |

* cited by examiner

PAD SPRING

CROSS-REFERENCE TO RELATED APPLICATION

This application claims the benefit of Korean Patent Application No. 10-2022-0090276, filed on Jul. 21, 2022 in the Korean Intellectual Property Office, the disclosure of which is incorporated herein by reference.

BACKGROUND

1. Field

Embodiments of the present disclosure relate to a pad spring of a caliper brake, and more specifically, to a pad spring of which portions in contact with a brake pad have different rigidities to maintain a constant distance between a disc and a pad plate of a brake.

2. Description of the Related Art

Generally, vehicles necessarily include braking systems for braking. In a caliper brake which is one of such braking systems, a hydraulic or electronic press member and a brake pad are mounted on a side surface of a disc which rotates with a vehicle wheel, when a pedal is pressed, the brake pad is pressed against the disc, and thus a frictional force is generated and used as a braking force for braking a vehicle.

That is, in the case of the caliper brake, the disc and a pad plate should come into contact with each other during braking of the vehicle, and a sufficient distance should be generated between the disc and the pad plate during traveling of the vehicle.

A pad spring is a component generally provided in the caliper brake and provided in a carrier for accommodating a brake shoe to generate a constant distance between the disc and the pad plate.

However, in the caliper brake, there are a leading side and a tailing side in the wheel of the vehicle due to a traveling direction, there are an inner side which directly receives a force of a mechanism and an outer side which indirectly receives the force of the mechanism in each of a pair of pad plates, and thus pressure applied to the brake shoe and the pad plate is asymmetrical during braking of the vehicle.

Since the conventional pad spring is formed of a uniform material and formed symmetrically, an entire pad spring has uniform rigidity. This is not appropriate to correspond to asymmetrical pressure received by a brake shoe and a pad plate, and as a result, a distance between a disc and the pad plate has become imbalanced as a vehicle repeatedly travels and brakes. As a result, a drag torque problem that the disc and the pad plate are rubbed occurs while the vehicle is traveling.

Accordingly, a new pad spring which can maintain a constant distance between a disc and a pad plate by appropriately corresponding to asymmetrical pressure received by a brake shoe and the pad plate during braking of a vehicle is required.

RELATED ART

Patent Document

Korean Patent Registration No. 10-1040937 (Registered on Jun. 7, 2011)

SUMMARY

Therefore, it is an aspect of the present disclosure to provide a pad spring which minimizes a drag torque by individually corresponding to asymmetric pressure applied to a brake shoe and a pad plate of a caliper brake during braking of a vehicle.

It is another aspect of the present disclosure to provide a pad spring in which a separate component is not required due to a material and a shape of the pad spring and a drag torque of a caliper brake is minimized to reduce manufacturing costs of the caliper brake.

In accordance with one aspect of the present disclosure, each of a pair of pad springs for elastically supporting a pair of pad plates on a carrier includes a pair of clip bases in contact with protruding surfaces of protrusions formed on two sides of the pad plates, a pair of first anchors connected to lower ends of the clip bases and formed to be curved in contact with lower surfaces of the protrusions, a pair of second anchors connected to upper ends of the clip bases and formed to be curved in contact with upper surfaces of the protrusions, a connector configured to connect the pair of second anchors, and a pair of retainers each having one end bonded to the clip bases and formed to extend inward and the other end curved outward to be in contact with and support the pad plates and formed to extend, wherein the pair of retainers include an inner retainer in contact with and supporting an inner pad of the pair of pad plates and an outer retainer in contact with and supporting an outer pad of the pair of pad plates, and the inner retainer is formed of a material having a higher rigidity than the outer retainer.

A thickness of the pair of retainers may decrease toward the clip base and increase toward the pad plate, and an average thickness of the inner retainer may be greater than an average thickness of the outer retainer.

A width of the pair of retainers may decrease toward the clip base and increase toward the pad plate, and an average width of the inner retainer may be greater than an average width of the outer retainer.

At least one opening may be formed in the pair of retainers, and a total area of the opening formed in the inner retainer may be smaller than a total area of the opening formed in the outer retainer.

A length of the inner retainer may be greater than a length of the outer retainer.

A portion of the inner retainer bonded to the clip base may be positioned closer to the pad plate than a portion of the outer retainer bonded to the other of the clip bases is.

In accordance with another aspect of the present disclosure, each of a pair of pad springs for elastically supporting a pair of pad plates on a carrier includes a pair of clip bases in contact with protruding surfaces of protrusions formed on two sides of the pad plates, a pair of first anchors connected to lower ends of the clip bases and formed to be curved in contact with lower surfaces of the protrusions, a pair of second anchors connected to upper ends of the clip bases and formed to be curved in contact with upper surfaces of the protrusions, a connector configured to connect the pair of second anchors, and a pair of retainers each having one end bonded to the clip bases and formed to extend inward and the other end curved outward to be in contact with and support the pad plates and formed to extend, wherein the pair of retainers include an inner retainer in contact with and supporting an inner pad of the pair of pad plates and an outer retainer in contact with and supporting an outer pad of the pair of pad plates, and the inner retainer is formed of a material having a lower rigidity than the outer retainer.

A thickness of the pair of retainers may decrease toward the clip base and increase toward the pad plate, and an average thickness of the inner retainer may be smaller than an average thickness of the outer retainer.

A width of the pair of retainers may decrease toward the clip base and increase toward the pad plate, and an average width of the inner retainer may be smaller than an average width of the outer retainer.

At least one opening may be formed in the pair of retainers, and a total area of the opening formed in the inner retainer may be greater than a total area of the opening formed in the outer retainer.

A length of the inner retainer may be smaller than a length of the outer retainer.

A portion of the inner retainer bonded to the clip base may be positioned farther from the pad plate than a portion of the outer retainer bonded to the other of the clip bases is.

The inner retainer may be formed of one of iron, aluminum, and hard plastic.

The outer retainer may be formed of one of iron, aluminum, and hard plastic.

A shape of the opening may include at least one of a circular shape, an elliptical shape, a rectangular shape, a square shape, and a rhombus shape.

BRIEF DESCRIPTION OF THE DRAWINGS

These and/or other aspects of the disclosure will become apparent and more readily appreciated from the following description of the embodiments, taken in conjunction with the accompanying drawings of which:

FIG. 2 is a cross-sectional view illustrating a state in which a retainer of the pad spring is in contact with and support a pad plate according to the present embodiment;

FIG. 3A-3C are a set of views each illustrating a side surface of a retainer of a pad spring according to a present embodiment, wherein FIG. 3A is a cross-sectional view illustrating a typical retainer, FIG. 3B is a cross-sectional view illustrating a retainer of which portions have different thicknesses, and FIG. 3C is a cross-sectional view illustrating two retainers having different lengths; and FIG. 4A-4C are a set of views each illustrating a front surface of a retainer of a pad spring according to a present embodiment, wherein FIG. 4A is a cross-sectional view illustrating a typical retainer, FIG. 4B is a cross-sectional view illustrating a retainer of which portions have different widths, and FIG. 4C is a cross-sectional view illustrating a retainer in which a plurality of openings are provided.

DETAILED DESCRIPTION

Figure 1:
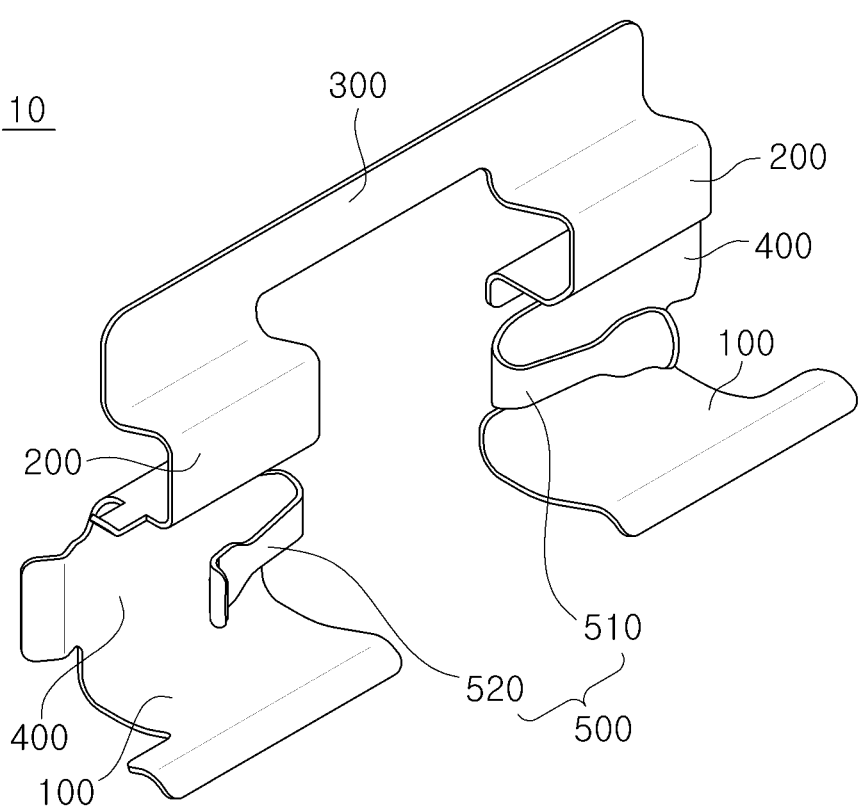
FIG. 1 is a perspective view illustrating a pad spring according to a present embodiment.

Hereinafter, embodiments of the present disclosure will be described in detail with reference to the accompanying drawings. The following embodiments are to provide the spirit of the present disclosure to those skilled in the art. The present disclosure is not limited to the embodiments disclosed herein and may be implemented in different forms. In the drawings, portions which are not related to the description may be omitted for clarifying the present disclosure, and sizes of components may be exaggerated for facilitating understanding of the present disclosure.

A caliper brake is a braking device of a vehicle and operates to generate a frictional force by bring a disc and a pad plate 20 into contact with each other during braking and generate a sufficient distance between the disc and the pad plate 20 during traveling. In this case, a pad spring 10 is a general component of the caliper brake provided in a carrier to generate a constant distance between the disc and the pad plate 20. However, since the conventional pad spring 10 has a symmetrical shape and is formed of a material having uniform rigidity, the conventional pad spring 10 cannot appropriately overcome asymmetrical pressure applied to a brake shoe and the pad plate 20. As a result, a constant distance between the disc and the pad plate 20 cannot be provided, or distances between the disc and specific portions of the pad plate 20 become different, and thus a drag torque problem that the disc and the pad plate 20 are rubbed against each other occurs during traveling. The present disclosure is intended to address the problems by implementing the pad spring 10 of which a portion for coming into contact with the pad plate 20 and a portion for supporting the pad plate 20 have different rigidities in order to appropriately overcome asymmetric pressure.

Figure 2:
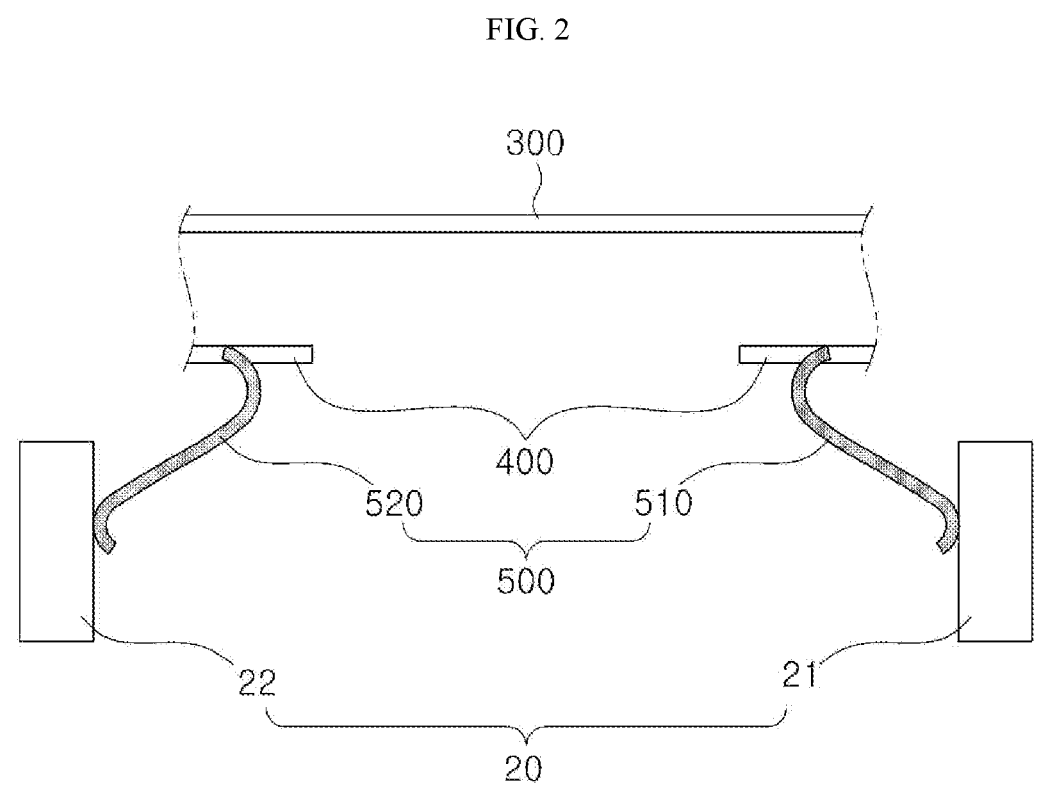

FIG. 1 is a perspective view illustrating a pad spring 10 according to a present embodiment, and FIG. 2 is a cross-sectional view illustrating a state in which retainers 500 of the pad spring 10 are in contact with and support pad plates 20 according to the present embodiment. Referring to FIGS. 1 and 2, the pad spring 10 according to the embodiment of the present disclosure is provided as a pair of pad springs 10 to elastically support a pair of pad plates 20 on a carrier. Specifically, protrusions are formed on two sides of the pad plates, and the pad spring 10 includes a pair of clip bases 400 each in contact with a protruding surface of one of the protrusions, a pair of first anchors 100 connected to a lower end of the clip base 400 and formed to be curved in contact with a lower surface of the protrusion, a pair of second anchors 200 connected to an upper end of the clip base 400 and formed to be curved in contact with an upper surface of the protrusion, a connecter 300 for connecting the pair of second anchors 200, and a pair of retainers 500 each having one end bonded to the clip base 400 and formed to extend inward and the other end curved and formed to extend outward to be in contact with and support one of the pad plates. The pair of retainers 500 includes an inner retainer 510 which is in contact with and supports an inner pad 21 of the pair of pad plates and an outer retainer 520 which is in contact with and supports an outer pad 22 of the pair of pad plates. The inner retainer 510 and the outer retainer 520 are in contact with and support an inner surface of the inner pad 21 and an inner surface of the outer pad 22, respectively.

In this case, the inner retainer 510 is provided to have a different rigidity from the outer retainer 520. In order to implement the different rigidities, there are a method in which the inner retainer 510 and the outer retainer 520 are formed of different materials and a method in which the inner retainer 510 and the outer retainer 520 have different shapes.

In a forming method using different materials, the inner retainer 510 may be formed of a material having higher rigidity than the outer retainer 520, and conversely, the inner retainer 510 may be formed of a material having a lower rigidity than the outer retainer 520. In this case, the material having the higher rigidity may be one among iron, aluminum, and hard plastic.

In a forming method to have different shapes, there is a method of differentiating a thickness, a length, a bonding position, a width, and presence of an opening 530 between the inner retainer 510 and the outer retainer 520.

Figure 3A:
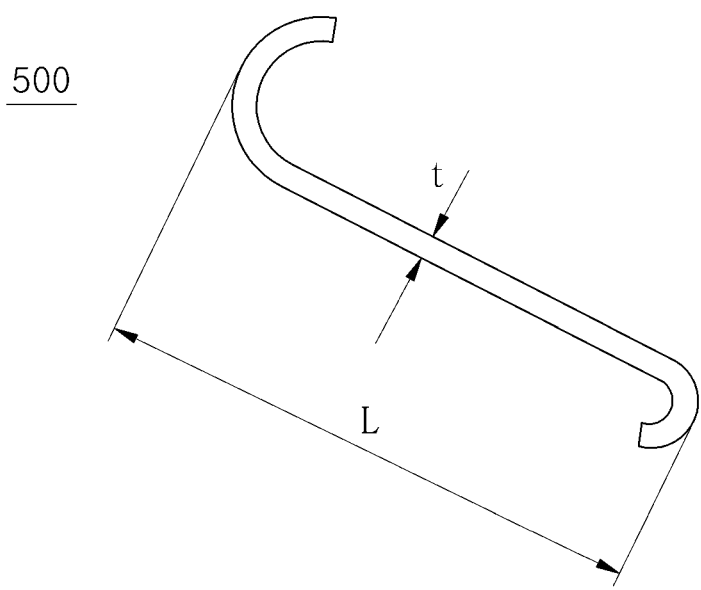
Figure 3B:
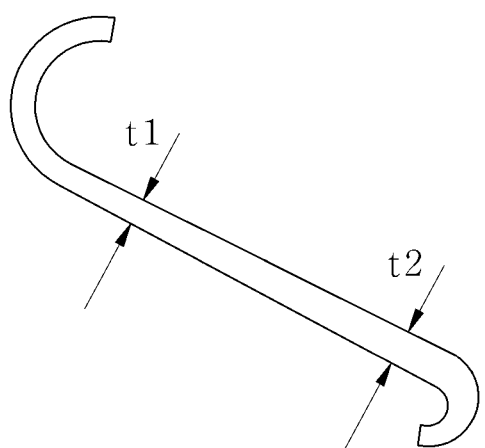
Figure 3C:
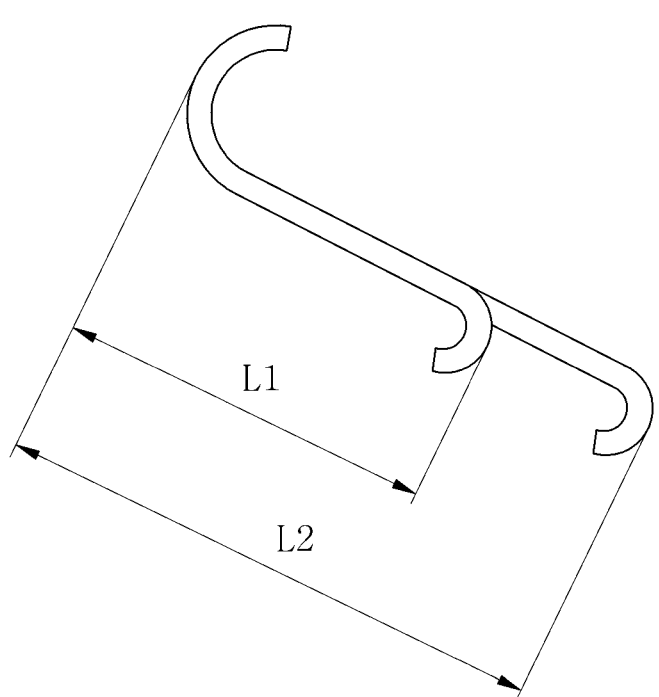

FIG. 3 is a set of views each illustrating a side surface of a retainer 500 of a pad spring 10 according to a present embodiment, wherein FIG. 3A is a cross-sectional view illustrating a typical retainer 500, FIG. 3B is a cross-sectional view illustrating a retainer 500 of which portions have different thicknesses, and FIG. 3C is a cross-sectional view illustrating two retainers 500 having different lengths. Referring to FIG. 3, in FIG. 3A, the retainer 500 may have a length L and a thickness t. Generally, the retainer 500 of a pad spring 10 has a constant thickness tin a longitudinal direction (in a length L direction). However, as illustrated in FIG. 3B, the retainer 500 may be formed to have a thickness which decreases toward a clip base 400 and increases toward a pad plate so that a specific rigidity of the entire retainer 500 may be implemented, and an inner retainer 510 and an outer retainer 520 may be formed to have different rigidities through such a method. That is, in order for the inner retainer 510 to have higher rigidity than the outer retainer 520, an average thickness of the inner retainer 510 should be greater than an average thickness of the outer retainer 520. In the opposite case, an average thickness of the inner retainer 510 should be smaller than an average thickness of the outer retainer 520.

In addition, as illustrated in FIG. 3C, a specific rigidity of the entire retainer 500 may be implemented by varying a length of the retainer 500, and a rigidity of an inner retainer 510 and a rigidity of an outer retainer 520 may be differently implemented through such a method. That is, in order for the inner retainer 510 to have higher rigidity than the outer retainer 520, a length of the inner retainer 510 should be greater than a length of the outer retainer 520. In the opposite case, a length of the inner retainer 510 should be smaller than a length of the outer retainer 520.

As illustrated in FIG. 3B, in the retainer 500 of the caliper brake according to the present embodiment, when a portion close to the clip base 400 has a thickness t1, and a portion close to the pad plate has a thickness t2, the thickness t1 may be smaller than the thickness t2, and as an example, the thickness t1 may be 0.3 mm, and the thickness t2 may be 0.5 mm. In addition, as illustrated in FIG. 3C, in the retainer 500 of the caliper brake, when a greater length is a length L2, and a smaller length is a length L1, the length L1 may be smaller than the length L2, and as an example, the length L1 may be 12 mm, and the length L2 may be 15 mm. In this case, the retainer 500 having a large average value of thicknesses between a thickness t1 and a thickness t2 has a greater rigidity than the retainer 500 having a small average value thereof, and the retainer 500 having the length L2 has a greater rigidity than the retainer 500 having the length of L1. However, the present embodiment is not limited to the thickness t1, the thickness t2, the length L1, and the length L2 and includes any thickness t in which a thickness t2 is smaller than a thickness t2, and any length L in which a length L1 is smaller than a length L2.

A rigidity may also vary according to a portion of the retainer 500 bonded to the clip base 400. There is a method of adjusting a position of one end of the retainer 500 bonded to the clip base 400 of the pad spring 10 to adjust a distance between the other end of the retainer 500 and the pad plate 20. In this case, even when the retainer 500 has a constant length L, the same effect as a case in which the inner retainer 510 and the outer retainer 520 have different rigidities can be achieved. That is, in order for the inner retainer 510 to have a higher rigidity than the outer retainer 520, a portion of the inner retainer 510 bonded to the clip base 400 should be positioned closer to the pad plate than a portion of the retainer 520 bonded to the clip base 400 is. In the opposite case, a portion of the inner retainer 510 bonded to the clip base 400 should be positioned farther from the pad plate than a portion of the outer retainer 520 bonded to the clip base 400 is.

Referring to FIG. 2, the retainers 500 of the caliper brake according to the present embodiment are bonded to the pair of clip bases 400. In this case, as portions at which of the retainers 500 and the clip bases 400 are bonded are close in an inward direction, less deformation occurs even when the pad plates 20 are compressed at the same distance. That is, the same operation as that of the retainers 500 having low rigidities is performed.

Figure 4A:
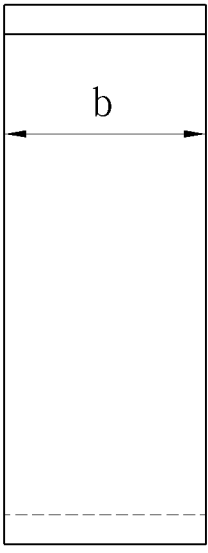
Figure 4B:
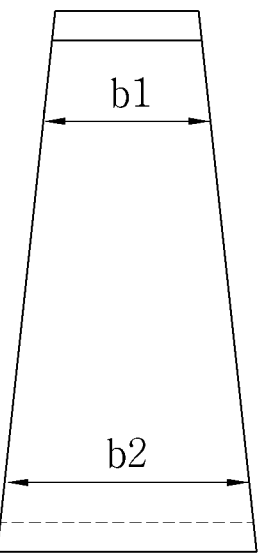
Figure 4C:
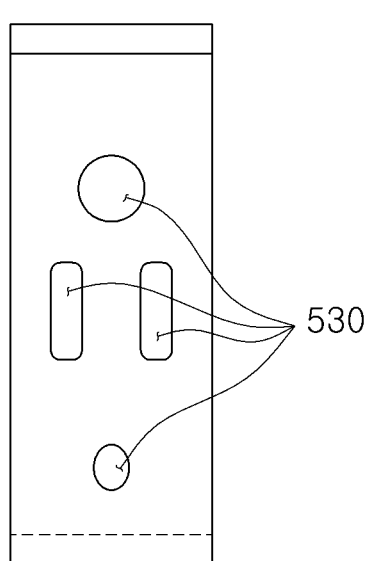

FIG. 4 is a set of views each illustrating a front surface of a retainer 500 of a pad spring 10 according to a present embodiment, wherein FIG. 4A is a cross-sectional view illustrating a typical retainer 500, FIG. 4B is a cross-sectional view illustrating a retainer 500 of which portions have different widths, and FIG. 4C is a cross-sectional view illustrating a retainer 500 in which a plurality of openings 530 are provided. Referring to FIG. 4, in FIG. 4A, the retainer 500 may have a width b. Generally, the retainer 500 of the pad spring 10 has a constant width b. However, as illustrated in FIG. 4B, a width of the retainer 500 may decrease toward a clip base 400 and increase toward a pad plate, and a rigidity of an inner retainer 510 and a rigidity of an outer retainer 520 may become different through such a method. That is, in order for the inner retainer 510 to have a higher rigidity than the outer retainer 520, an average width of the inner retainer 510 should be greater than an average width of the outer retainer 520. In the opposite case, an average width of the inner retainer 510 should be smaller than an average width of the outer retainer 520.

In addition, a specific rigidity of the entire retainer 500 may be implemented by forming at least one opening 530 in the retainer 500 as illustrated in FIG. 4C, and a rigidity of an inner retainer 510 and a rigidity of an outer retainer 520 may become different through such a method. In this case, a shape of the opening 530 may include at least one of a circular shape, an elliptical shape, a rectangular shape, a square shape, and a rhombus shape. That is, in order for the inner retainer 510 to have a higher rigidity than the outer retainer 520, a total area of the opening 530 formed in the inner retainer 510 should be smaller than a total area of the opening 530 formed in the outer retainer 520. Otherwise, a total area of the opening 530 formed in the inner retainer 510 should be greater than a total area of the opening 530 formed in the outer retainer 520.

As illustrated in FIG. 4B, in the retainer 500 of the caliper brake according to the present embodiment, when a portion close to the clip base 400 has a width b1, and a portion close to the pad plate has a width b2, the width b1 may be smaller than the width b2, and as an example, the width b1 may be 0.8 mm and the width b2 may be 10 mm. In addition, as illustrated in FIG. 4C, the retainer 500 of the caliper brake may include a circular opening 530, an elliptical opening 530, and a plurality of openings 530. A rigidity of the retainer 500 having a large total area of the openings 530 is smaller than a rigidity of the retainer 500 having a small total area of the openings 530. However, the present embodiment is not limited to the width b1 and the width b2 and includes any width b in which a width b1 is smaller than a width b2, and the present embodiment is not limited to the shapes and the numbers of the openings 530 and includes any shape and number of the openings 530 passing through the retainer 500.

The pad spring 10 of the vehicle according to the present embodiment having such a configuration includes the plurality of retainers 500 provided at four positions divided into a leading side, a tailing side, an inner side, and an outer side, and the retainers 500 may have different rigidities according to materials, thicknesses, lengths, connection positions, widths, and presence of openings 530 to appropriately correspond to asymmetrical pressure applied to the brake shoe and the pad plate 20 of the caliper brake and minimize a drag torque. Since the present embodiment has the method in which the material and the shape of the retainer 500 are changed, an appropriate rigidity can be easily implemented according to a type of the caliper brake, and thus the pad spring 10 can be highly universal, and a target rigidity can be implemented by simply changing the configuration, thereby reducing manufacturing costs of the caliper brake.

As is apparent from the above description, the present embodiment minimizes a drag torque by corresponding to asymmetric pressure applied to a brake shoe and a pad plate of a caliper brake during braking of a vehicle.

The present embodiment does not require a separate component due to a material and a shape of a pad spring and can minimize a drag torque of a caliper brake, and thus manufacturing costs of the caliper brake is reduced.

What is claimed is:

1. A pair of pad springs for elastically supporting a pair of pad plates on a carrier, the pad springs comprising:
   a pair of clip bases in contact with protruding surfaces of protrusions formed on two sides of the pad plates;
   a pair of first anchors connected to lower ends of the clip bases and formed to be curved in contact with lower surfaces of the protrusions;
   a pair of second anchors connected to upper ends of the clip bases and formed to be curved in contact with upper surfaces of the protrusions;
   a connector configured to connect the pair of second anchors; and
   a pair of retainers having one ends bonded to the pair of clip bases and formed to extend inward and the other ends curved outward to be in contact with and support the pair of pad plates and formed to extend,
   wherein the pair of retainers include an inner retainer in contact with and supporting an inner pad, which directly receives a force of a press member, of the pair of pad plates, and an outer retainer in contact with and supporting an outer pad, which indirectly receives the force of the press member, of the pair of pad plates, and
   the inner retainer is formed of a material having a higher rigidity than a material of the outer retainer to correspond to asymmetric pressure applied to the pair of pad plates,
   wherein:
   at least one opening is formed in a flat portion of each of the pair of retainers; and
   a total area of the opening formed in the inner retainer is smaller than a total area of the opening formed in the outer retainer.

2. The pad spring of claim 1, wherein a portion of the inner retainer bonded to one of the pair of clip bases is positioned closer to one of the pad plates than a portion of the outer retainer bonded to the other of the clip bases is to the other of the pair of pad plates.

3. The pad spring of claim 1, wherein the inner retainer is formed of one of iron, aluminum, and hard plastic.

4. The pad spring of claim 1, wherein a shape of the opening includes at least one of a circular shape, an elliptical shape, a rectangular shape, a square shape, and a rhombus shape.

5. A pair of pad springs for elastically supporting a pair of pad plates on a carrier, the pad springs comprising:
   a pair of clip bases in contact with protruding surfaces of protrusions formed on two sides of the pad plates;
   a pair of first anchors connected to lower ends of the clip bases and formed to be curved in contact with lower surfaces of the protrusions;
   a pair of second anchors connected to upper ends of the clip bases and formed to be curved in contact with upper surfaces of the protrusions;
   a connector configured to connect the pair of second anchors; and
   a pair of retainers having one ends bonded to the pair of clip bases and formed to extend inward and the other ends curved outward to be in contact with and support the pair of pad plates and formed to extend,
   wherein the pair of retainers include an inner retainer in contact with and supporting an inner pad, which indirectly receives a force of a press member, of the pair of pad plates, and an outer retainer in contact with and supporting an outer pad, which directly receives a force of the press member, of the pair of pad plates, and
   the inner retainer is formed of a material having a lower rigidity than a material of the outer retainer to correspond to asymmetric pressure applied to the pair of pad plates,
   wherein:
   at least one opening is formed in a flat portion of each of the pair of retainers; and
   a total area of the opening formed in the inner retainer is greater than a total area of the opening formed in the outer retainer.

6. The pad spring of claim 5, wherein a portion of the inner retainer bonded to one of the pair of clip bases is positioned farther from one of the pair of pad plates than a portion of the outer retainer bonded to the other of the clip bases is from the other of the pair of pad plates.

7. The pad spring of claim 5, wherein the outer retainer is formed of one of iron, aluminum, and hard plastic.

8. The pad spring of claim 5, wherein a shape of the opening includes at least one of a circular shape, an elliptical shape, a rectangular shape, a square shape, and a rhombus shape.

* * * * *